United States Patent [19]

Baker

[11] Patent Number: 5,181,404
[45] Date of Patent: Jan. 26, 1993

[54] MOTOR VEHICLE BRAKE PEDAL LOCKING DEVICE

[76] Inventor: Franklin W. Baker, 1502 ½ N. LaBrea, Inglewood, Calif. 90302

[21] Appl. No.: 767,409

[22] Filed: Sep. 30, 1991

[51] Int. Cl.$^5$ .............................................. G05G 5/00
[52] U.S. Cl. ........................................ 70/203; 70/237; 74/532; 254/DIG. 5
[58] Field of Search .......................... 70/164, 198–203, 70/237, 228, 254; 74/532; 254/DIG. 5; 188/265

[56] References Cited

U.S. PATENT DOCUMENTS

| | | | |
|---|---|---|---|
| 1,442,203 | 1/1923 | Williams et al. | 70/202 |
| 1,444,379 | 2/1923 | Jones | 70/202 |
| 1,480,149 | 1/1924 | Carpenter | 70/203 |
| 4,076,095 | 2/1978 | Adamski | 70/202 X |
| 4,747,465 | 5/1988 | Hodgson | 70/200 X |
| 4,876,865 | 10/1989 | Trinidad et al. | 70/203 |
| 5,001,913 | 3/1991 | Gamboni | 70/202 |

FOREIGN PATENT DOCUMENTS

| | | | |
|---|---|---|---|
| 4726 | 12/1932 | Australia | 70/164 |
| 625760 | 8/1927 | France | 70/199 |
| 997868 | 7/1965 | United Kingdom | 70/203 |
| 2023520 | 1/1980 | United Kingdom | 70/203 |
| 2198403 | 6/1988 | United Kingdom | 70/237 |

Primary Examiner—Lloyd A. Gall
Attorney, Agent, or Firm—Albert O. Cota

[57] ABSTRACT

A brake pedal locking device having a pin (20) permanently mounted in a vehicle floorboard and a locking compression member (33) that preferably consists of a locking channel (34) having an angular plate (44) with a pin bore (46). When the channel is placed over a vehicle brake pedal (42) the bore interfaces with the pin to lock the device in place. Engaging arms (56) are depressed by the vehicle driver for installation of the device and release arms (66) are depressed to remove the device from the wedged position between the break pedal (42) and the floorboard pin (20). A key lock (63) or a removable pad lock (64) is used to secure the device and an alarm unit (90) is activated when an unauthorized removal of the device is taking place. A carrying handle (54) permits ease of handling and a switch or the like with openable electrical contacts (72) deenergizes the vehicle's brake light when the device is installed.

26 Claims, 5 Drawing Sheets

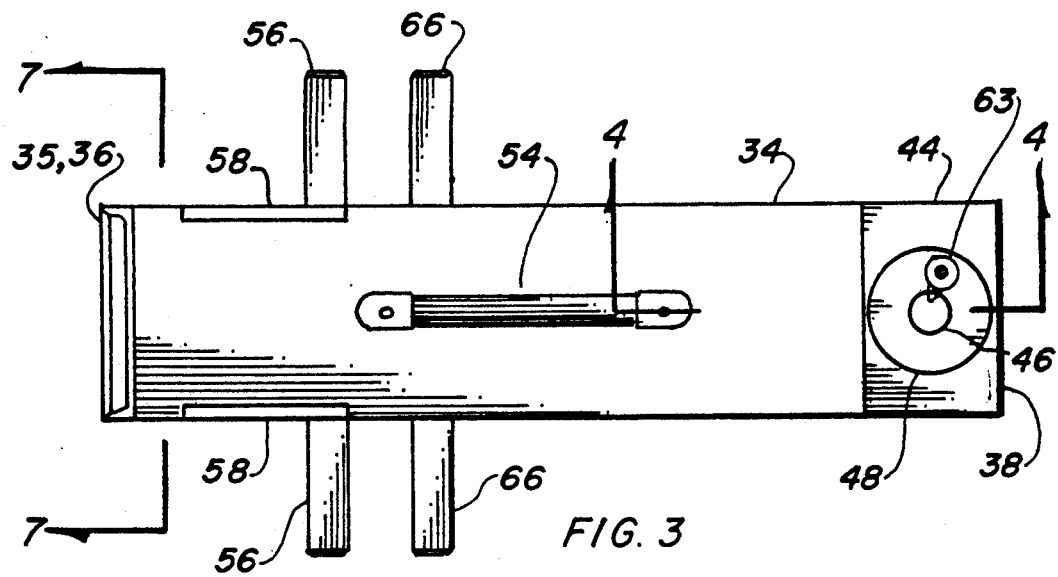
FIG. 3
FIG. 4
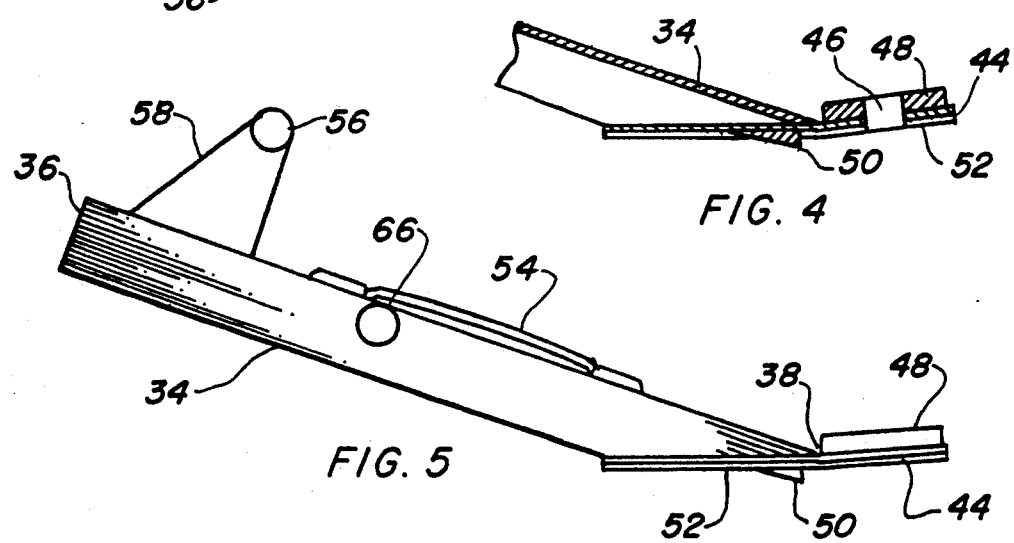
FIG. 5
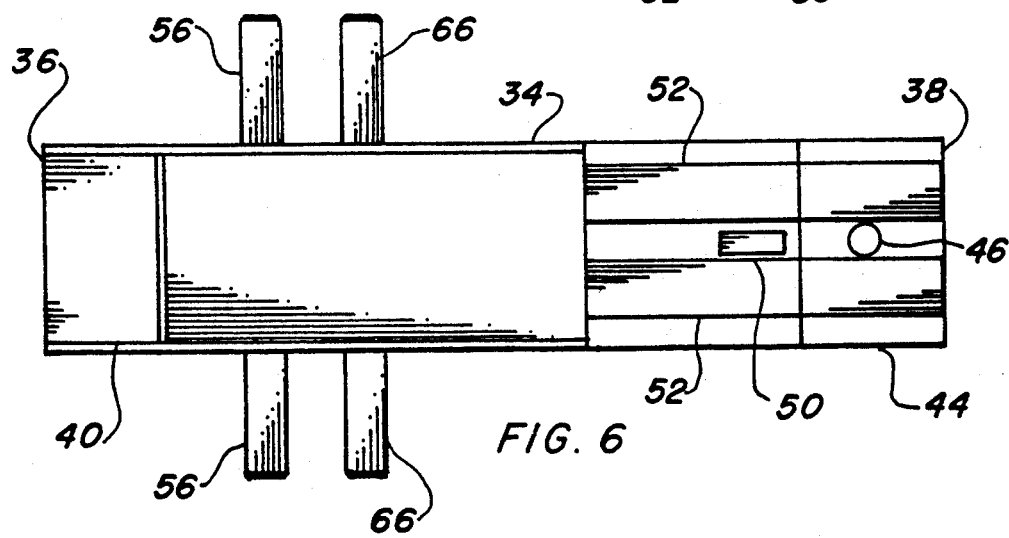
FIG. 6

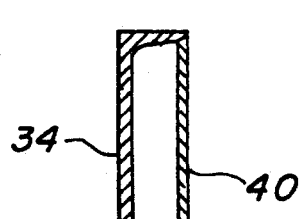
FIG. 7
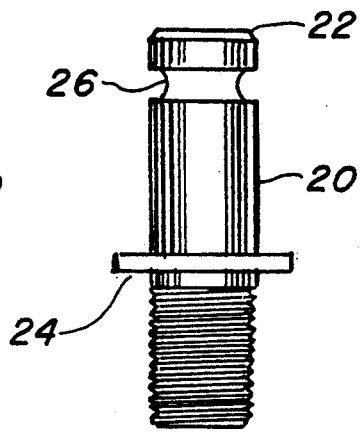
FIG. 8
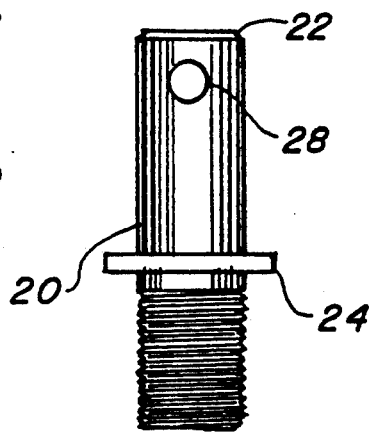
FIG. 9
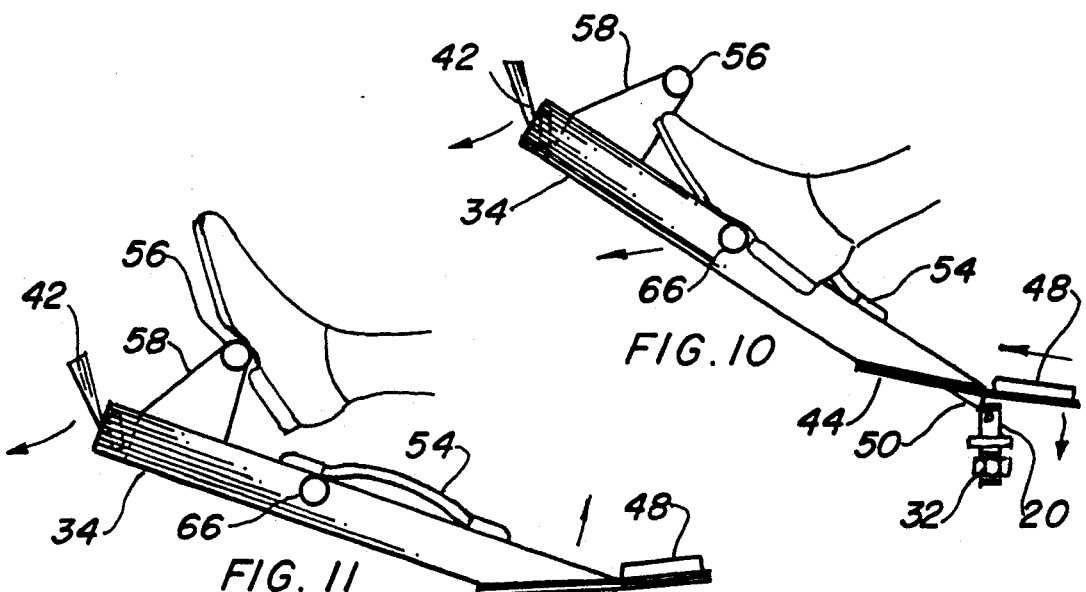
FIG. 10
FIG. 11
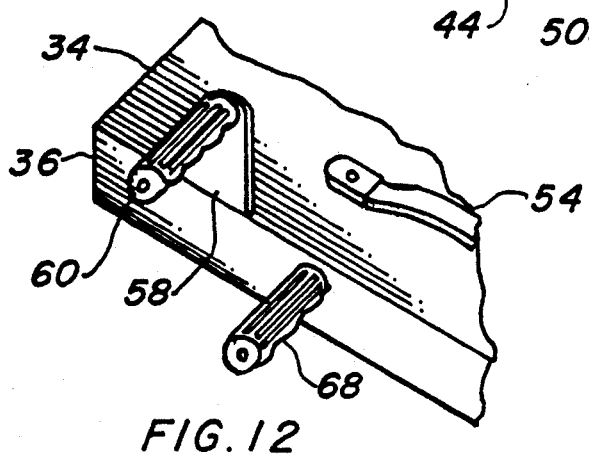
FIG. 12
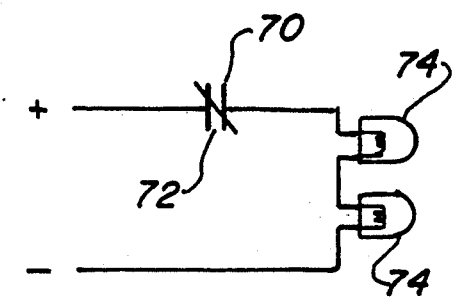
FIG. 13

MOTOR VEHICLE BRAKE PEDAL LOCKING DEVICE

TECHNICAL FIELD

The present invention generally relates to locking devices for vehicles and more specifically to a device that applies and maintains the vehicle brakes in a locked position with mechanical attachment to the vehicle floorboard.

BACKGROUND ART

Previously many types of locking systems have been used in conjunction with the brake pedals of an automobile, truck, service vehicle or the like for physical protection to prevent unauthorized use or theft of the vehicle.

Other systems range from electrically operated latches or mechanical hooks, yokes, brackets and bars all of which lock the brakes in place.

A search of the prior art did not disclose any patents that read directly on the claims of the instant invention however, the following U.S. patents were considered related:

| U.S. PAT. NO. | INVENTOR | ISSUED |
| --- | --- | --- |
| 5,001,913 | Gamboni | 26 March 1991 |
| 4,903,510 | Surles | 27 February 1990 |
| 4,779,435 | Farrow | 25 October 1988 |
| 4,333,326 | Winters | 8 June 1982 |
| 4,076,095 | Adamski | 28 February 1978 |

Gamboni in U.S. Pat. No. 5,001,913 teaches a locking mechanism fixed to the firewall of a vehicle with a set of pawls grasping a locking bar attached to the brake pedal. A key lock and ratchet mechanically actuate the locking mechanism.

U.S. Pat. No. 4,903,510 of Surles discloses a hook member locked through the floorboard grasping the vehicle brake pedal. A key actuated deadbolt locks the hook member to the floorboard.

Farrow in U.S. Pat. No. 4,779,435 employs a yoke below the brake pedal and a hook grasping the spoke of the steering wheel. A lock pin is secured with a padlock forming a mechanical link between the steering wheel and brake.

U.S. Pat. No. 4,333,326 of Winters teaches a base permanently attached to a vehicle floorboard with two members extending upward one on each side of the brake pedal and a padlock retaining the pedal rendering the brake inoperative.

Adamski uses a pair of parallel bars installed between the brake and clutch pedal of a vehicle in U.S. Pat. No. 4,076,095. This arrangement includes supports preventing either pedal from becoming depressed and a lock with a depressing pin maintaining security of the apparatus and ultimately, the vehicle.

DISCLOSURE OF THE INVENTION

In the United States, car theft has grown to enormous proportions and the normal protection provided by automobile or truck manufacturers is insufficient to curb the problem. Many electronic devices with audio and visual alarms are in present use, also mechanical devices locking the steering wheel have been widely accepted. However, electronic devices may be shut off and vehicles may be towed from the back when the steering wheel is locked and only the parking brakes are on.

In view of the above, it is the primary object of the invention to use a mechanical device consisting of a locking compression member, such as a locking channel, in combination with a floor mounted stationary pin. The device has sufficient strength to preclude removal with conventional tools and locks the brakes on all four wheels of the vehicle. With all of the wheels locking in the emergency position, a conventional tow truck cannot lift the vehicle from one end or move it at all. Even rolling onto a towing platform type vehicle is eliminated as caster skids would be required on all four wheels which is difficult to do quickly as each end of the vehicle would require lifting.

An important object of the invention is that even if a thief opened the vehicle and turned on the ignition, it would be impossible to drive away as the engine power would not overcome the resistance of the brakes, thus maintaining the security of the vehicle.

Another object of the invention is directed to the use of a key lock to secure the stationary pin to the locking channel to prevent the device from being removed. Alternatively, almost any type of padlock may be used to secure the pin to the locking channel. This object does not limit the type of lock to be used. Therefore, thieves would not necessarily be acquainted with the same type in each similar device making each encounter by a thief dissimilar in nature. To further deter the removal of the device an audio and visual alarm may be included that is energized when an unauthorized removal of the device is in process.

Still another object of the invention is to provide an anti-theft device that is simple in construction relatively easy to manufacture and yet rugged and durable enough to thwart any thief.

Yet another object of the invention is the strength of the device and massiveness that would discourage the thief and yet the device is small enough to be easily carried in the vehicle and installed instantly by hand and then locked securely by the driver's feet.

A further object of the invention is that when the device is removed, only a non-obstructing pin is left permanently in place. The modification to the vehicle is held to a minimum as only one pin bore is drilled into the floorboard to attach the pin.

These and other objects and advantages of the present invention will become apparent from the subsequent detailed description of the preferred and second embodiments and the claims taken in conjunction with the accompanying drawings.

BRIEF DESCRIPTION OF THE DRAWINGS

FIG. 3 is a top view of the preferred embodiment.

FIG. 4 is a cross sectional view taken along lines 4—4 of FIG. 3.

FIG. 5 is a side view of the preferred embodiment.

FIG. 6 is a bottom view of the preferred embodiment.

FIG. 7 is a cross sectional view taken along lines 7—7 of FIG. 3.

FIG. 8 is a side elevation view of the rigid upstanding pin having a groove for the lock.

FIG. 9 is a side elevation view of the rigid upstanding pin having a bore for the lock.

FIG. 10 is a diagram of the preferred embodiment being installed in place with a driver's foot pushing on the device engaging arms.

FIG. 11 is a diagram of the preferred embodiment being released from its locking position with a driver's foot pushing on the device release arms.

FIG. 12 is a fragmentary isometric view of the locking channel with resilient grips installed on the engaging and release arms.

FIG. 13 is a schematic of a typical brake light deenergizing circuit means.

BEST MODE FOR CARRYING OUT THE INVENTION

Figure 1:
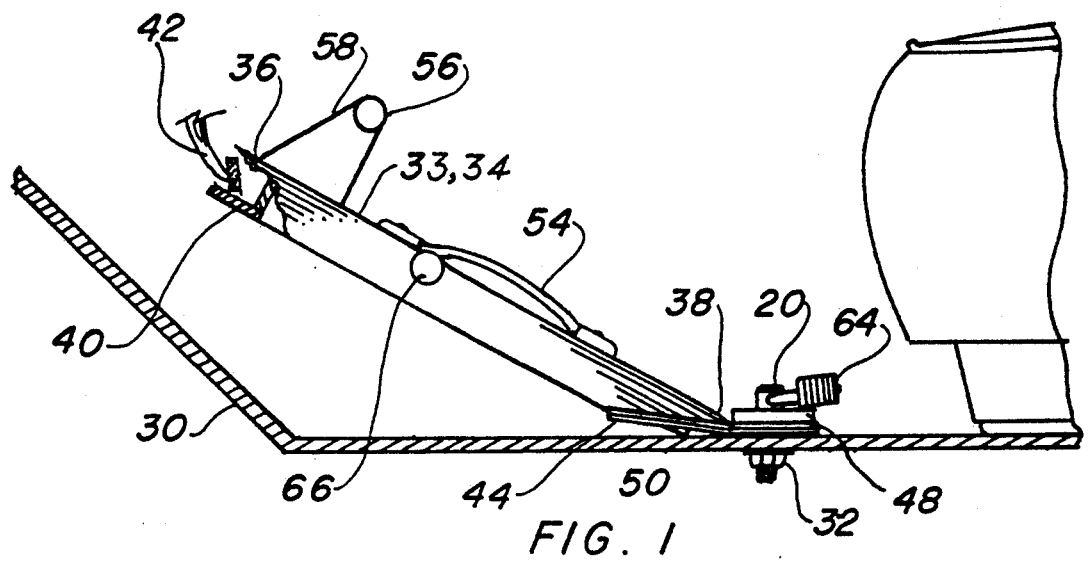
FIG. 1 is a side elevational view of the preferred embodiment of the invention fully installed in a motor vehicle with the locking channel cut away to illustrate captivation of the brake pedal with only applicable portions of the motor vehicle illustrated.

The best mode for carrying out the invention is presented in terms of a preferred and a second embodiment. Both embodiments of the motor vehicle brake pedal locking device are primarily designed to lock the brakes of a motor vehicle to preclude an unauthorized movement of the vehicle.

In its basic configuration, applicable to both the preferred and second embodiments, the device consists of two basic elements: a rigid upstanding pin 20 and a locking compression member 33 consisting of a locking channel 34 or a locking tube 76.

The pin 20 is permanently positioned onto a vehicle floorboard 30 in substantial alignment with the break pedal 42. The locking compression member 33 has at its front end a break pedal engagement means 35 for applying pressure to the break pedal 42 and at its back end, a pin receiving end 38 that has a pin bore 46 therethrough. The pin bore is sized to allow the pin 20 to be insertably retained within the pin bore to mechanically link the break pedal 42 with the floorboard 30 to thus maintain engagement of the vehicle brakes.

The vehicle brakes are maintained in their engaged position and subsequently released by a device engagement and releasing means. This means allows the locking compression member 33 to be set into its break locking position and to be released by using the vehicle driver's feet. To prevent an unauthorized removal of the locking compression member, the pin 20 is equipped with a pin locking means that prevents the member 33 from being lifted over the pin.

The preferred embodiment, as shown in FIGS. 1 through 14 is comprised of the rigid pin 20. The pin is round in shape and has a chamfer 22 on its upper end. The pin 20 further has a shoulder 24 near the middle and is threaded on the end opposite the chamfer. The pin 20 includes either a groove 26 around its periphery as best shown in FIG. 8 or a lock bore 28 as illustrated in FIG. 9; either one is located near the chamfer 22. The pin 20 is installed through the floorboard 30 in substantial alignment with the brake pedal of a motor vehicle. The pin's shoulder 24 interfaces with the floorboard's top side and a nut 32 compressibly engages the threaded portion on the bottom. In order to assure a tamper-proof connection, the end of the threaded portion of the pin 20 extending beyond the nut is either peened over or welded to preclude easy removal.

It will be noted that although the pin 20 is upstanding from the floorboard 30 in use, it is not in the way as the driver's feet are normally forward of the area surrounding the pin.

The main structural member of the preferred embodiment is a locking compression member 33 in the form of a locking channel 34 shown by itself in FIGS. 3, 5 and 6 and in cross section in FIGS. 4 and 7. The channel 34 is formed with a front square end set at 90° and a back end set at an angle that corresponds to the configuration of the motor vehicle. The front end includes a pedal engagement means 35 that in the preferred embodiment consists of a pedal engagement cavity 36. The cavity forms a keeper 40 having an internal configuration slightly larger than a vehicle brake pedal 42. Thus, when the channel is placed on the floorboard and the cavity 36 is slipped over the pedal 42, the pedal is held captive. The back end is formed integrally with an angular plate 44 in which a pin bore 46 is located. A reinforcing ring 48 surrounds the bore and is of sufficient thickness to strengthen and add linear depth to the bore.

When the locking device is installed, the channel 34 is placed onto the brake pedal 42 and over the pin 20 with the pin 20 penetrating the bore 46 mechanically linking the brake pedal 42 with the floorboard 30.

The channel 34 may further include a placement ramp 50 underneath the angular plate 44 for temporarily holding the channel in place during installation. When the brake is partially depressed the ramp 50 snaps over the pin 20 maintaining this position allowing easy completion of the installation process.

A pair of pin guides 52 are longitudinally positioned beneath the angular plate 44 around the pin bore 46 to form a guide channel for centering and guiding the angular plate over the ramp 50 and the pin 20. The guides 52 are spaced slightly wider than the diameter of the pin 20 allowing ease of alignment and sliding containment during installation.

A carrying handle 54 is affixed to the top of the channel 34 for positioning during installation and removal and provides a convenient method of handling for storage.

A pair of pedal engaging arms 66 protrude outwardly from each side of the locking channel 34 near the front end. The arms 66 are approximately the width of a driver's foot and allow the driver to depress the brake pedal 42 when installing the invention. A resilient grip 68 may be optionally slipped over each arm to provide a non-slip surface as shown in FIG. 12.

Figure 2:
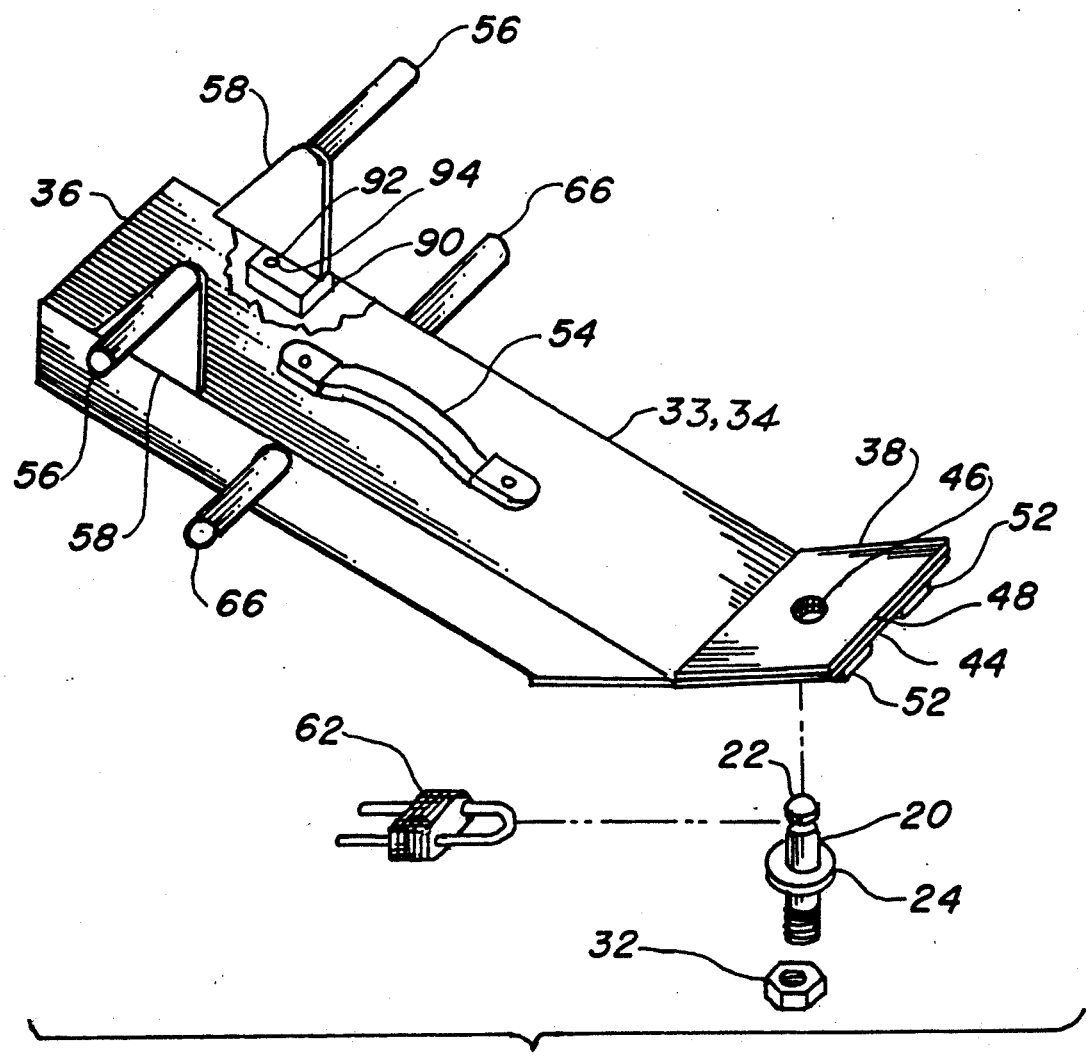
FIG. 2 is a partial isometric view of the preferred embodiment shown exploded for clarity.
Figure 14:
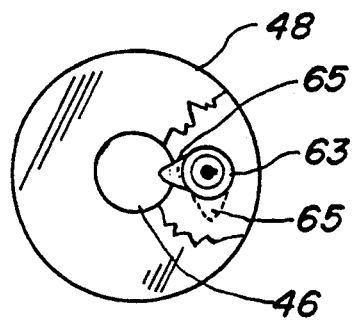
FIG. 14 is a plan view of a key lock switch that is used to lock the locking channel to the pin.

When the channel 34 has been installed with the brake pedal 42 depressed and the pin is extending through the pin bore 46 a pin locking means is employed that prevents the unauthorized removal of the locking compression member. The preferred locking means consists of a key lock 63 as shown in FIG. 14. The key lock has a key-moved latch 65 that fits into the groove 26 of the pin 22. Alternatively, a removable hasp lock 62 or a padlock 64 as shown in FIG. 2, is employed to secure the connection. If the pin 20 contains the groove 26, the removable hasp type lock is used as it has a U-shaped hasp that fits around the groove 26 of the pin 20. This embodiment of the locking means is easily removed by inserting the key and disassembling the two parts.

If a padlock 64 is used as shown in FIG. 1, the hasp of the padlock 64 is placed through the lock bore 28 in the pin 20 and is pushed into the lock body in a conventional manner. The bore 28 in the pin 20 is graphically illustrated in FIG. 9 where the pin is shown separately.

In order to remove the locking channel 34 from the motor vehicle, a pair of pedal releasing arms 56 are positioned on the channel 34 in front of and above the engaging arms 66. These release arms 56 distend outwardly the same approximate distance as the engaging arms 66 and are permanently attached to brackets 58 to elevate the arms to such an angle that when the arms are pressed downwardly by the driver's feet, the back end of the channel 34 raises to automatically release the device from the pin 20. Resistant grips 60 may be optionally added to provide a non-slip surface.

In order to keep the brakes engaged when the device is installed, it is necessary to turn off the brake lights of the vehicle to prevent the battery from depleting all of its energy.

To accomplish this task, a brake light deenergizing circuit means 70 is employed. Such a circuit may contain a set of contacts 72 that break the electrical circuit and remain open when the device is in place and the vehicle ignition switch is in the OFF position. This type of electrical circuit interruption is well known in the art and consists of time delay relays, push button switches, electromechanical relays, manual switches and a myriad of other devices made for that purpose. FIG. 13 schematically illustrates the lights 74 and the contacts 72 and their operating relationship. The simplest embodiment is to place a push button switch at any point in the vehicle where the actuating plunger is depressed by the installation of the channel 34 and returns to its normally closed position upon removal.

In operation, the device is removed from its storage place somewhere in the vehicle and manually placed over the brake pedal 42 and near the top of the pin 20. The pedal engaging arms 66 are then manually depressed until the placement ramp 50 snaps into place. The driver then places his feet on the pedal engaging arms 66 and pushes until the pin 20 is in alignment with the hole 46 and the angular plate 44 drops over the pin 20. This engages the vehicle brakes and the brake lights are automatically deenergized. The key lock 63 is then set or either the lock 62 or 64 is fastened to the pin and the vehicle is secured.

To remove the invention, the procedure is simply reversed except the driver presses on the release arms 56 which simultaneously presses on the brake pedal 42 and lifts the back end or pin receiving end 38 of the device, releasing the tension of the pin 20 on the bore 46 allowing the entire device to pivot upwardly and allow the brake to return to its normal position. The device may be stored in the vehicle and is easily carried by the handle 54.

The invention as shown in FIG. 2, may also be equipped with an alarm unit 90 that is attached to the inside surface of the locking channel 34. The alarm unit includes an audible alarm (not shown) and a light source. The audible alarm preferably consists of the vehicle horn that is connected to the unit 90 by conventional methods. The light source 92 is attached to the top of the alarm unit and protrudes through a light bore 94 on the channel 34 as also shown in FIG. 2. Alternatively, the vehicle headlights may be connected in parallel with the integral light source 92 in a conventional manner that is also not shown.

The alarm unit is powered by an internal battery and is activated when the device is angularly offset from its installed position.

Figure 15:
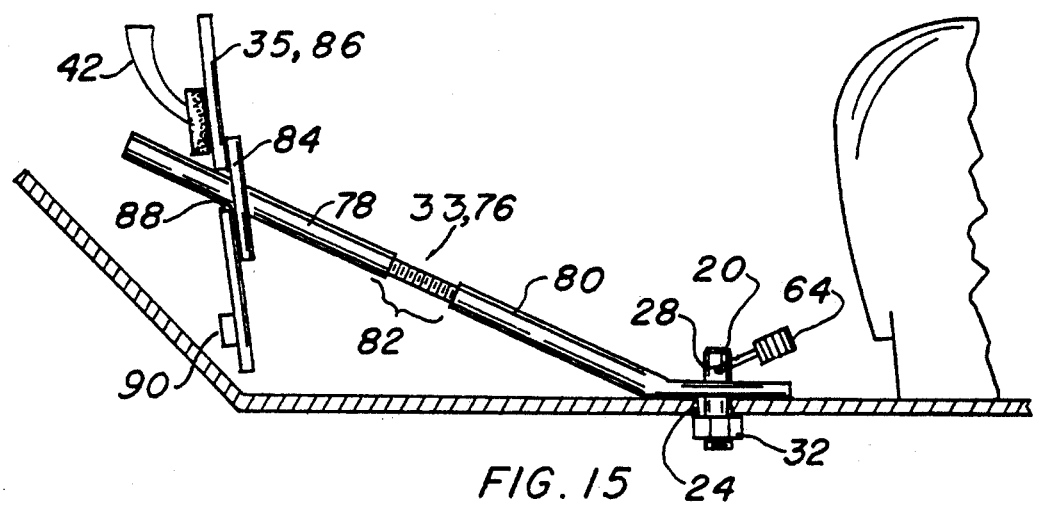
FIG. 15 is a side elevational view of the second embodiment of the invention fully installed in a motor vehicle showing the captivation of the break pedal with only applicable portions of the motor vehicle illustrated.
Figure 16:
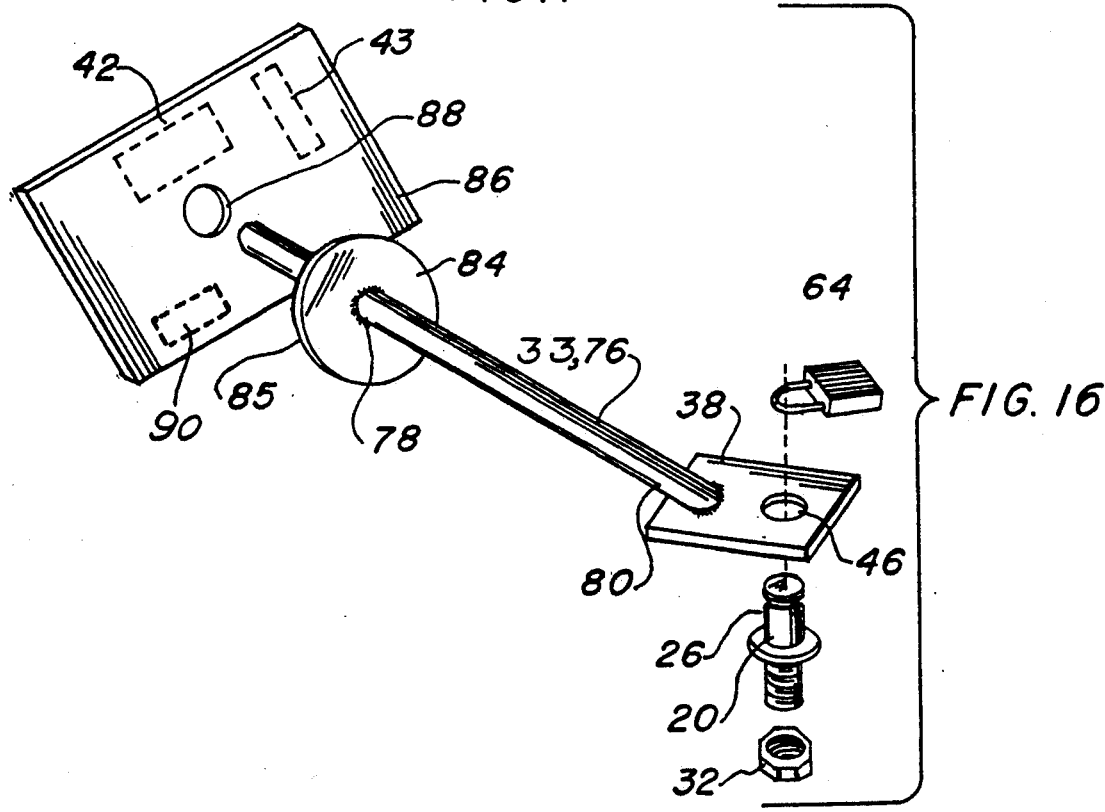
FIG. 16 is a partial isometric view of the second embodiment shown exploded for clarity.

The second embodiment of the motor vehicle brake pedal locking device, as shown in FIGS. 15-18, is comprised of a rigid pin 20 identical to the pin 20 described for the preferred embodiment and is attached and located in a similar manner. The main structural member of the second embodiment is a locking compression member 33 in the form of a locking tube 76. The tube has a front end 78 and a back end 80. Near the front end as shown best in FIG. 16, is located a stop plate 84 and at the back end is integrally attached a pin receiving end 38 that has a pin bore 46 therethrough.

The brake pedal 42 engaging and depressing means is achieved by a pedal cover 86 that is sized to substantially cover both the brake pedal and the acceleration pedal as shown in FIG. 16. The cover has a tube bore 88 therethrough that is sized to allow the front of the tube to easily slide therein. The tube is designed to slide under the brake pedal 42 and is retained from further forward movement by the back surface 85 of the stop plate 84.

Figure 17:
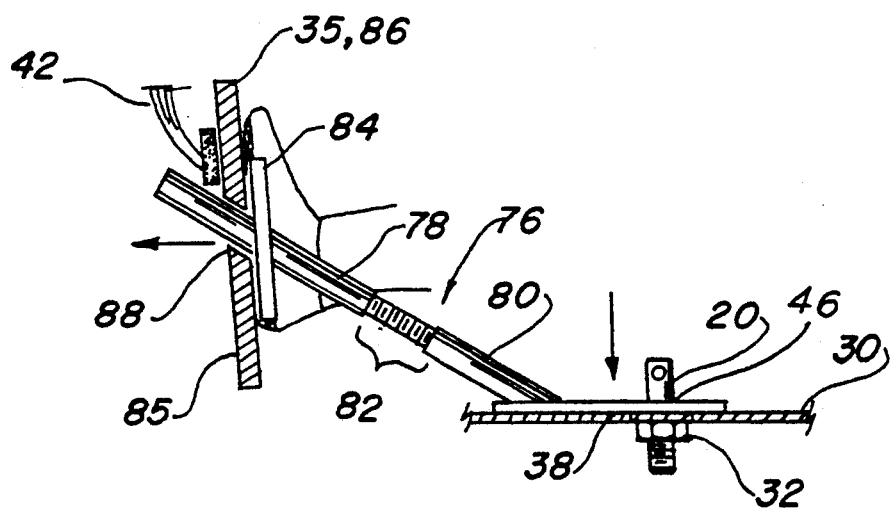
FIG. 17 is a diagram of the second embodiment being installed in place with a driver's foot pushing on the lower section of the pedal cover.
Figure 18:
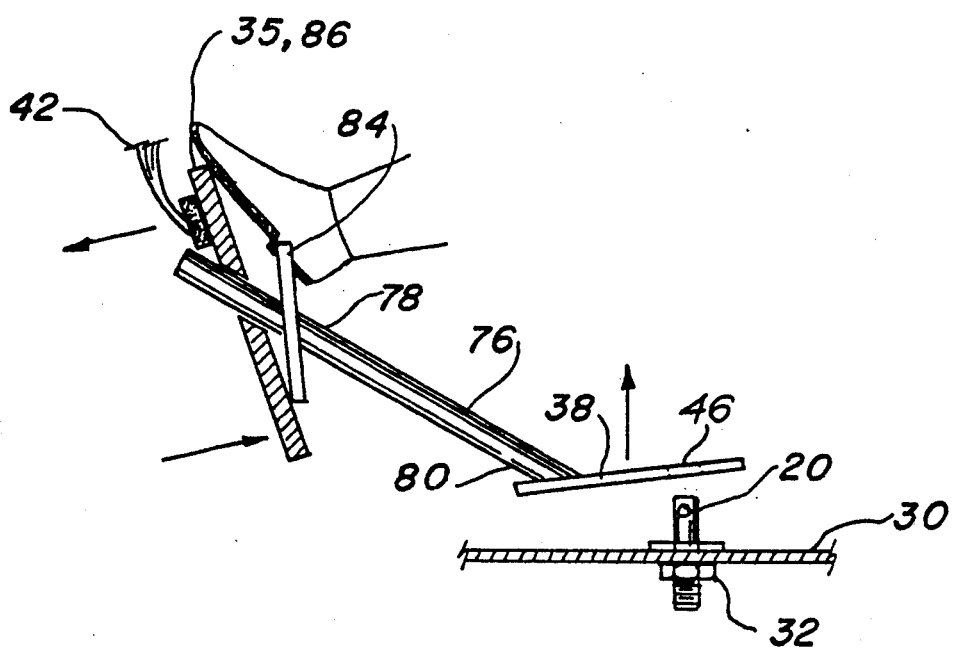
FIG. 18 is a diagram of the second embodiment being released from its locked position with a driver's foot pushing on the upper section of the pedal cover.

When pressure is applied to the lower sections of the stop plate 84 and pedal cover 86 by the driver's feet as shown in FIG. 17, the brake pedal 42 is depressed for a distance that activates the breaks an allows the pin to be insertably retained in the pin bore 46. Conversely, when pressure is applied to the upper sections of the plate 84 and cover 86 as shown in FIG. 18, the locking tube rises and becomes disengaged from the pin to thus allow the locking device to be removed.

The second embodiment may include a locking tube 76 that furthers includes a tube length locking means 82. This means as shown in FIG. 15, preferably consists of a locking tube having a front section and a back section. The front section includes a back extending threaded section that is adjustably threaded into a mating set of threads located on the front of the second section.

The remaining elements of the second embodiment which include the pin locking means and the alarm unit 90 are identical to the first embodiment and are therefor not described. The alarm unit 90 as shown in FIGS. 15 and 16 is located on the back surface of the pedal cover 86.

While the invention has been described in complete detail and pictorially shown in the accompany drawings, it is not to be limited to such details, since many changes and modifications may be made in the invention without departing from the spirit and the scope thereof. For example, the material used to make the device may consist of a metal or a plastic. Hence, it is described to cover any and all modifications and forms which may come within the language and scope of the claims.

I claim:

1. A theft preventing motor vehicle brake pedal locking device for use with vehicles having a foot operated brake pedal and structural floorboard, said device comprising:

a) a rigid upstanding pin positioned permanently onto a vehicle floorboard in substantial alignment with the vehicle brake pedal, b) a locking compression member in the form of a locking channel having a front end and a back end with the front end having a pedal engagement cavity that forms a keeper with an internal configuration slightly larger than the brake pedal for containment of the pedal, and the back end having a pin bore therethrough, with said pin insertably retained in the bore mechanically linking the brake pedal with the floorboard, c) a pair of pedal engaging arms located near the front end of said locking channel for depressing the brake pedal when installing the device, d) a pin locking means engaging said pin preventing removal of said channel, and e) a pair of pedal releasing arms disposed outwardly from said locking channel near the front end and above the pedal engaging arms for disengaging said channel from said pin when said pin locking means has been removed for detachment of the device from the vehicle.

2. The brake pedal locking device as recited in claim 1 wherein said upstanding pin further comprises a chamfer on one end for centering the pin into said pin bore on said locking channel, a shoulder integrally formed with the pin to interface with the floorboard and threads with a nut on an end opposite the chamfer for compressibly engaging said pin to the vehicle floorboard.

3. The brake pedal locking device as recited in claim 1 wherein said locking channel further comprises an angular plate formed integrally with the back end of the channel for engagement with the floorboard and said pin.

4. The brake pedal locking device as recited in claim 3 further comprising a placement ramp centrally disposed upon the angular plate for temporarily holding the channel in place between the brake pedal and the pin during installation of the locking device.

5. The brake pedal locking device as recited in claim 3 further comprising a pair of rectangular pin guides longitudinally positioned beneath the angular plate around the pin bore to form a guide channel for centering and guiding the angular plate over the pin as the angular plate is manually pushed forward by said engaging arms.

6. The brake pedal locking device as recited in claim 1 further comprising a carrying handle affixed to said locking channel for facilitating handling during installation, removal and storage.

7. The brake pedal locking device as recited in claim 1 wherein said pedal engaging arms further comprise a resilient grip frictionally disposed over each arm providing a non-slip surface when depressing said pedal engaging arms.

8. The brake pedal locking device as recited in claim 1 wherein said pin locking means further comprises a key lock having a key-moved latch that fits into a groove located around the periphery of said pin.

9. The brake pedal locking device as recited in claim 1 wherein said pin locking means further comprises a lock having a U-shaped hasp and a body with a pair of openings for the hasp, said pin further having a groove positioned away from the floorboard permitting the hasp of the lock to be captivated within the groove and the lock body to receive the hasp in the openings provided and intimately embrace the pin preventing the channel from being removed from the pin when installed in a motor vehicle.

10. The brake pedal locking device as recited in claim 1 wherein said locking means further comprises a padlock having a hasp, and said pin having a bore therethrough positioned away from the floorboard permitting the hasp of the lock to be captivated within the bore preventing the channel from being removed from the pin when installed in a motor vehicle.

11. The brake pedal locking device as recited in claim 1 wherein said pedal releasing arms further comprise a resilient grip frictionally disposed over each releasing arm providing a non-slip surface when releasing the brake pedal.

12. The brake pedal locking device as recited in claim 1 further comprising a brake light deenergizing circuit means that disengages the brake lights from the vehicle's electrical system when the locking channel is locked in place in the motor vehicle.

13. The brake pedal locking device as recited in claim 1 further comprising an alarm unit attached to an inside surface of said locking channel where said unit includes an audible alarm and a light source and is energized by a switch controlled power means and is activated when said device is angularly offset from its installed position.

14. The brake pedal locking device as recited in claim 13 wherein said audible alarm consists of the vehicle horn.

15. The brake pedal locking device as recited in claim 14 wherein said light source consists of the vehicle headlights.

16. The brake pedal locking device as recited in claim 15 wherein said power means comprises an internal battery located within said alarm unit.

17. A theft preventing motor vehicle brake pedal locking device for use with vehicles having a foot operated brake pedal and structural floorboard, said device comprising:

a) a rigid upstanding pin positioned permanently onto a vehicle floorboard in substantial alignment with the vehicle brake pedal, b) a locking compression member in the form of a locking tube having a front end and a back end, said tube having a stop plate located near its front end, and where the back end has an integrally attached pin receiving end having a pin bore therethrough, c) a pedal cover having a back surface that is sized to substantially cover the vehicle's brake pedal and accelerator pedal, said cover having a tube bore therethrough sized to allow the front of said locking tube to easily slide therein, where the front of said locking tube slides under the brake pedal and is retained from further forward movement by the back surface of said stop plate, where when pressure is applied to the lower sections of said stop plate and pedal cover by the driver's feet the brake pedal is depressed for a distance that allows said pin to be insertably retained in the pin bore mechanically linking the brake pedal with the floorboard, and conversely, when pressure is applied to the upper sections of said stop plate and pedal cover the locking tube rises and becomes disengaged from said pin to thus allow said locking device to be removed, and d) a pin locking means engaging said pin preventing removal of said locking tube.

18. The brake pedal locking device as recited in claim 17 wherein said locking tube further comprises a tube length adjusting means.

19. The brake pedal locking device as recited in claim 18 wherein said tube length adjusting means comprises a locking tube consisting of a front section and a back section where the front section includes a threaded section that extends from its back end that is adjustably threaded into a mating set of threads located on the front end of the back section.

20. The brake pedal locking device as recited in claim 17 wherein said upstanding pin further comprises a chamfer on one end for centering the pin into said pin bore on said pin receiving end, a shoulder integrally formed with the pin to interface with the floorboard and threads with a nut on one end opposite the chamfer for compressibly engaging said pin to the vehicle floorboard.

21. The brake pedal locking device as recited in claim 17 wherein said pin locking means further comprises a key lock having a key-moved latch that fits into a groove located around the periphery of said pin.

22. The brake pedal locking device as recited in claim 17 further comprising a brake light deenergizing circuit means that disengages the brake lights from the vehicle's electrical system when the locking tube is locked in place in the motor vehicle.

23. The brake pedal locking device as recited in claim 17 further comprising an alarm unit attached to the back surface of said pedal cover where said unit includes an audible alarm and a light source and is energized by a switch controlled power means and is activated when said device is angularly offset from its installed position.

24. The brake pedal locking device as recited in claim 23 wherein said audible alarm consists of the vehicle horn.

25. The brake pedal locking device as recited in claim 24 wherein said light source consists of the vehicle headlights.

26. The brake pedal locking device as recited in claim 25 wherein said power means comprises an internal battery located within said alarm unit.

* * * * *